(12) United States Patent
Hu et al.

(10) Patent No.: US 12,464,515 B2
(45) Date of Patent: Nov. 4, 2025

(54) METHOD AND APPARATUS OF GROUP-BASED RESOURCE ALLOCATION

(71) Applicant: LENOVO (BEIJING) LIMITED, Beijing (CN)

(72) Inventors: Jie Hu, Changping District (CN); Jing Han, Chaoyang District (CN); Haiming Wang, Xicheng District (CN); Lianhai Wu, Chaoyang (CN); Jie Shi, Haidian District (CN); Ran Yue, Haidian District (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 647 days.

(21) Appl. No.: 17/793,212

(22) PCT Filed: Feb. 14, 2020

(86) PCT No.: PCT/CN2020/075339
§ 371 (c)(1),
(2) Date: Jul. 15, 2022

(87) PCT Pub. No.: WO2021/159491
PCT Pub. Date: Aug. 19, 2021

(65) Prior Publication Data
US 2023/0069615 A1 Mar. 2, 2023

(51) Int. Cl.
*H04W 72/121* (2023.01)
(52) U.S. Cl.
CPC .................. *H04W 72/121* (2013.01)

(58) Field of Classification Search
CPC .................................................. H04W 72/121
See application file for complete search history.

(56) References Cited

U.S. PATENT DOCUMENTS

2011/0274070 A1* 11/2011 Xia ........................ H04W 72/04
370/329
2012/0158820 A1* 6/2012 Bai ........................ G07C 5/008
709/202
(Continued)

FOREIGN PATENT DOCUMENTS

CN 108770035 A 11/2018
CN 110611940 A * 12/2019 ........ H04W 36/0083
(Continued)

OTHER PUBLICATIONS

AT&T, "Resource allocation mechanism", 3GPP TSG RAN WG1 Meeting #95, R1-1812872, Spokane, USA [retrieved Aug. 24, 2022]. Retrieved from the Internet <https://www.3gpp.org/ftp/TSG_RAN/WG1_RL1/TSGR1_95/Docs/>., Nov. 2018, 11 Pages.
(Continued)

*Primary Examiner* — Liem H. Nguyen
(74) *Attorney, Agent, or Firm* — FIG. 1 Patents

(57) ABSTRACT

The subject application relates to method and apparatus of group-based resource allocation. A method performed by a first Base station (BS), comprises: transmitting a scheduling user equipment (S-UE) qualification criterion to a group of UEs; receiving at least one request for being a first S-UE from at least one member UE (M-UE) in the group that satisfies the S-UE qualification criterion; transmitting a signal indicating the first S-UE based on the at least one
(Continued)

request; and transmitting, to the first S-UE, group-based resource information for the group of UEs.

20 Claims, 5 Drawing Sheets

(56) References Cited

U.S. PATENT DOCUMENTS

| | | | |
|---|---|---|---|
| 2012/0322484 A1* | 12/2012 | Yu | H04W 4/08 |
| | | | 455/519 |
| 2018/0279096 A1* | 9/2018 | Wu | H04W 72/121 |
| 2020/0396719 A1* | 12/2020 | Sheu | H04W 72/02 |
| 2021/0021536 A1* | 1/2021 | Ganesan | H04L 47/56 |
| 2021/0037603 A1* | 2/2021 | Li | H04L 1/189 |
| 2021/0212023 A1* | 7/2021 | Zeng | H04W 4/48 |
| 2021/0274545 A1* | 9/2021 | Adjakple | H04W 72/21 |
| 2021/0289480 A1* | 9/2021 | Chang | H04W 72/21 |
| 2021/0377993 A1* | 12/2021 | Ayaz | H04L 5/0094 |
| 2023/0033619 A1* | 2/2023 | Lovlekar | H04W 72/541 |
| 2024/0323654 A1* | 9/2024 | Selvanesan | H04W 4/027 |

FOREIGN PATENT DOCUMENTS

| | | |
|---|---|---|
| EP | 1742426 A1 | 1/2007 |
| EP | 3316658 A1 | 5/2018 |
| WO | 2020006733 A1 | 1/2020 |

OTHER PUBLICATIONS

INTEL, "Feature Lead Summary for NR-V2X AI—7.2.4.1.4 Resource Allocation Mechanism", 3GPP TSG RAN WG1 Meeting #96, R1-1903623, Athens, Greece [retrieved Aug. 24, 2022]. Retrieved from the Internet <https://www.3gpp.org/DynaReport/TDocExMtg-R1-96-32821.htm>., Mar. 2019, 18 Pages.

PCT/CN2020/075339, "International Search Report and Written Opinion", PCT Application No. PCT/CN2020/075339, Nov. 18, 2020, 7 pages.

PCT/CN2020/075339, "International Preliminary Report on Patentability", PCT Application No. PCT/CN2020/075339, Aug. 25, 2022, 6 pages.

* cited by examiner

METHOD AND APPARATUS OF GROUP-BASED RESOURCE ALLOCATION

TECHNICAL FIELD

The present application generally relates to wireless communications, and more particularly, to group-based resource allocation.

BACKGROUND

The wireless communications network has grown rapidly over the years. The next generation wireless communication system 5G is an example of an emerging telecommunication standard. 5G, or new radio (NR) networks are expected to increase throughput, coverage, and robustness and reduce latency and operational and capital expenditures. In general, NR is a set of enhancements to the Long Term Evolution (LTE) mobile standard promulgated by the 3rd Generation Partnership Project (3GPP).

With the development of the 5G system, various aspects need to be studied to perfect the 5G NR technology.

SUMMARY

One aspect of the present disclosure provides a method performed by a first Base station (BS), wherein the method comprises: transmitting a scheduling user equipment (S-UE) qualification criterion to a group of UEs; receiving at least one request for being a first S-UE from at least one member UE (M-UE) in the group that satisfies the S-UE qualification criterion; transmitting a signal indicating the first S-UE based on the at least one request; and transmitting, to the first S-UE, group-based resource information for the group of UEs.

Another aspect of the present disclosure provides a method performed by a user equipment (UE), wherein the method comprises: receiving a scheduling user equipment (S-UE) qualification criterion from a base station (BS); transmitting a request to the BS for being a S-UE if the S-UE qualification criterion is satisfied; and if the UE is configured by the BS as the S-UE for a group of UEs: broadcasting an indication indicating the S-UE to one or more member UEs (M-UEs) in the group; transmitting assistance information to the BS; receiving group-based resource information from the BS; and transmitting the group-based resource information to the one or more M-UEs.

Another aspect of the present disclosure provides a method performed by a user equipment (UE) in a group of UEs, wherein the method comprises: receiving a first indicator indicating a second UE in the group as a scheduling user equipment (S-UE); transmitting member UE information to the S-UE; and receiving group-based resource information from the S-UE.

Another aspect of the present disclosure provides a method performed by a first Base station (BS), wherein the method comprises: receiving a handover command from a second BS, wherein the handover command comprises a scheduling user equipment (S-UE) selection indication and at least one of group information and group traffic information; determining a S-UE for a group of UEs based on the S-UE selection indication; and transmitting, to the S-UE, group-based resource information for the group.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G, 3GPP LTE Release 8 and so on. It is contemplated that along with developments of network architectures and new service scenarios, all embodiments in the present application are also applicable to similar technical problems; and moreover, the terminologies recited in the present application may change, which should not affect the principle of the present application.

Figure 1:
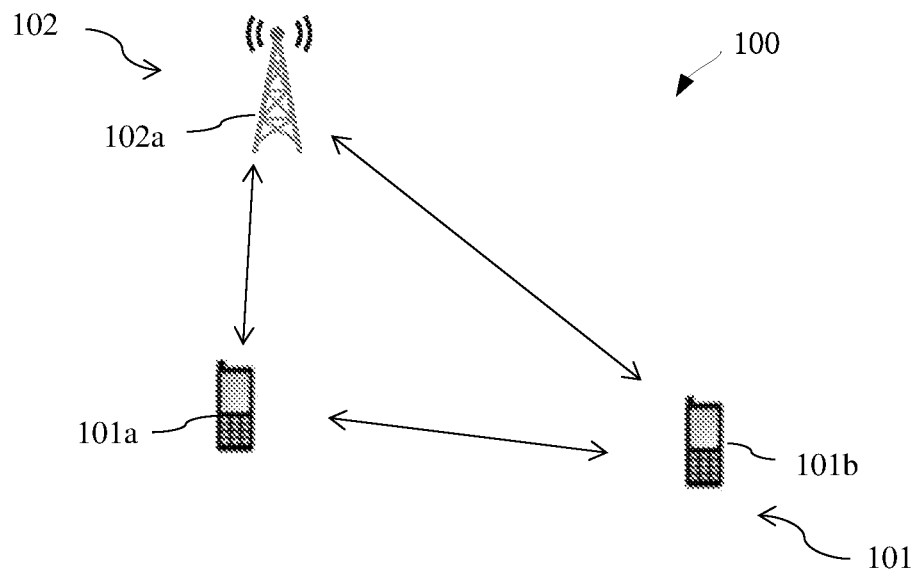
FIG. 1 illustrates a schematic diagram of a wireless communication system in accordance with some embodiments of the present application.

FIG. 1 illustrates a schematic diagram of a wireless communication system in accordance with some embodiments of the present application.

As illustrated and shown in FIG. 1, a wireless communication system 100 includes at least one user equipment (UE) 101 and at least one base station (BS) 102. In particular, the wireless communication system 100 includes one UE 101 (e.g., UE 101a and UE 101b) and three BSs 102 (e.g., BS 102a) for illustrative purpose. Although a specific number of UEs 101 and BSs 102 are depicted in FIG. 1, it is contemplated that any number of UEs 101 and BSs 102 may be included in the wireless communication system 100.

The UE(s) 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), internet of things (IoT) devices, or the like. According to some embodiments of the present application, the UE(s) 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments of the present application, the UE(s) 101 includes wearable devices, such as smart watches, fitness bands, optical head-mounted displays, or the like. Moreover, the UE(s) 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UE(s) 101 may communicate directly with BSs 102 via uplink (UL) communication signals.

The BS(s) 102 may be distributed over a geographic region. In certain embodiments of the present application, each of the BS(s) 102 may also be referred to as an access point, an access terminal, a base, a base unit, a macro cell, a Node-B, an evolved Node B (eNB), a gNB, a NG-RAN (Next Generation-Radio Access Network) node, a Home Node-B, a relay node, or a device, or described using other terminology used in the art. The BS(s) 102 is generally a part of a radio access network that may include one or more controllers communicably coupled to one or more corresponding BS(s) 102. BS(s) 102 may communicate directly with each other. For example, BS(s) 102 may communicate directly with each other via Xn interface or X2 interface.

The wireless communication system 100 may be compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, an LTE network, a 3GPP-based network, a 3GPP 5G network, a satellite communications network, a high altitude platform network, and/or other communications networks.

In some embodiments of the present application, the wireless communication system 100 is compatible with the 5G NR of the 3GPP protocol, wherein BS(s) 102 transmit data using an OFDM modulation scheme on the DL and the UE(s) 101 transmit data on the UL using a single-carrier frequency division multiple access (SC-FDMA) or OFDM scheme. More generally, however, the wireless communication system 100 may implement some other open or proprietary communication protocols, for example, WiMAX, among other protocols.

In some embodiments of the present application, the BS(s) 102 may communicate using other communication protocols, such as the IEEE 802.11 family of wireless communication protocols. Further, in some embodiments of the present application, the BS(s) 102 may communicate over licensed spectrums, whereas in other embodiments, the BS(s) 102 may communicate over unlicensed spectrums. The present application is not intended to be limited to the implementation of any particular wireless communication system architecture or protocol. In yet some embodiments of present application, the BS(s) 102 may communicate with the UE(s) 101 using the 3GPP 5G protocols.

In RAN #86 plenary meeting, the work item for Rel-17 sidelink enhancement is approved (RP-193257, 3GPP TSG RAN Meeting #86, New WID on NR side link enhancement, LG Electronics), and the objective of this work item is to specify radio solutions that can enhance NR sidelink for the V2X, public safety and commercial use cases. One of the objective for resource allocation enhancement listed as follow:

Resource allocation enhancement:

Specify resource allocation to reduce power consumption of the UEs [RAN1, RAN2]
Baseline is to introduce the principle of Rel-14 LTE sidelink random resource selection and partial sensing to Rel-16 NR sidelink resource allocation mode 2.
Note: Taking Rel-14 as the baseline does not preclude introducing a new solution to reduce power consumption for the cases where the baseline cannot work properly.
Study the feasibility and benefit of the enhancement(s) in mode 2 for enhanced reliability and reduced latency in consideration of both PRR and PIR defined in TR37.885 (by RAN#89), and specify the identified solution if deemed feasible and beneficial [RAN1, RAN2]
Inter-UE coordination with the following until RAN#88.
A set of resources is determined at UE-A. This set is sent to UE-B in mode 2, and UE-B takes this into account in the resource selection for its own transmission.
Note: The study scope after RAN#88 is to be decided in RAN#88.
Note: The solution should be able to operate in-coverage, partial coverage, and out-of-coverage and to address consecutive packet loss in all coverage scenarios.
Note: RAN2 work will start after RAN#89.

There may be potential case about Inter-UE coordination based on the WID:

Case 1: A set of resources is determined at UE-A is configured by gNB, and then UE-A relays the resource (pool) configuration to UE-B;

Case 2: A set of resource is determined at UE-A is configured by gNB, and then UE-A by implementation configures the resources to UE-B;

Case 3: A set of resource is determined at UE-A is sensed by UE-A, and then UE-A by implementation configures the resources to UE-B;

Case 4: A set of resource is determined at UE-A is sensed by UE-A, and then UE-A relays the resource pool configuration to UE-B;

Here, case 1 is discussed firstly, which is mode2d resource allocation mode in Rel-16. According to previous work in Rel-16, mode2 resource allocation related had been discussed in RAN1 meeting and the following agreements had been reached (see 3GPP TSG RAN WG1 Meeting #94 and #96, Chairman's' Notes):

RAN1 #94 Agreements:

Mode-2 definition covers potential sidelink radio-layer functionality or resource allocation sub-modes (subject to further refinement including merging of some or all of them) where
a) UE autonomously selects sidelink resource for transmission
b) UE assists sidelink resource selection for other UE(s)
c) UE is configured with NR configured grant (type-1 like) for sidelink transmission
d) UE schedules sidelink transmissions of other UEs.

RAN1 #96 Agreements:

In the context of Mode-2(d), NR V2X supports the following functionality:
A UE informs gNB about group members and gNB provides individual resource pool configuration and/or individual resource configuration through the same UE to each group member UE within the same group.

It does not require connection between member UE and gNB
The UE cannot modify the configuration provided by gNB
Higher layer signaling is to be used to provide the configuration.
No physical layer signaling is used
FFS if one or both options are supported (i.e. resource pool configuration(s) or resource configuration)
FFS which functionality defined as a part of Mode-2 is applicable for this feature
This functionality is up to UE capability(ies)

Figure 2:
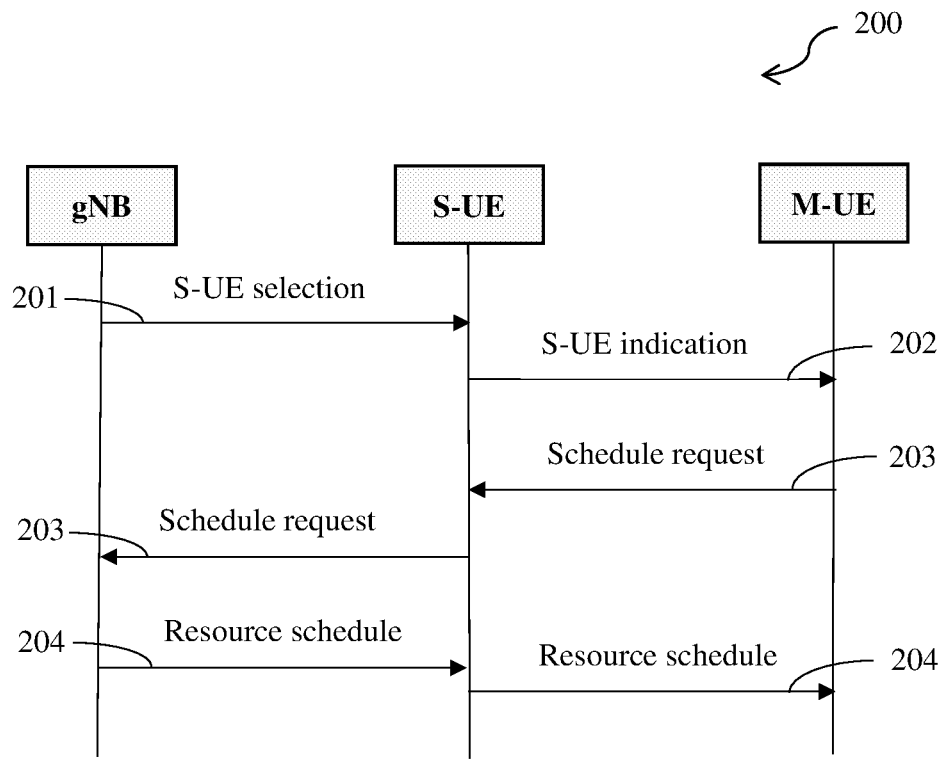
FIG. 2 illustrates a mode2d resource allocation procedure.

FIG. 2 illustrates a mode2d resource allocation procedure. The procedure 200 of FIG. 2 are explained in details as follows:

Step 201: gNB select which UE in the group can be served as scheduling UE;
 UE in the group send request to gNB to become scheduling UE for this group, the request including group information (e.g. group ID, group member information), UE ID, UE capability.
 gNB receive the request from UE in the group and configure one or multiple S-UEs for this group based on the UE capability and group member information.
Step 202: One or multiple S-UE announcing that it can schedule resources for group member UEs;
 S-UE broadcast an indication which indicate that it can schedule resources for M-UE.
Step 203: Group member UEs select S-UE for requesting resources, S-UE transmit the request to gNB.
 When M-UE receive the broadcasted indication signal from one or more than one S-UE, it select one S-UE and send schedule request to the selected S-UE.
 The S-UE selection for M-UE is based on measured signal strength (e.g. RSRP).
Step 204: gNB provide individual resource pool(s) configuration and/or individual resource configuration to group member UEs through scheduling UE.

However, there are still some issues that need to be addressed to perfect mode2d.

For example, one issue is: for mode2d, scheduling UE (S-UE) for the group needs to be determined firstly and assistance information also needs to be reported to gNB to assist e.g. group wise resource allocation. Then signalling design for S-UE selection and assistance information between gNB and S-UE, between S-UE and group Member UEs (M-UE) should be considered.

Since gNB provides the individual resource (pool) configuration through S-UE to each group M-UE. Then how to perform the resource scheduling between gNB and M-UEs through the S-UE needs to be considered. On one hand, the group S-UE determination should be considered firstly, generally speaking, gNB will configure the S-UE based on the UE request. However, each UE in the group may apply to be the S-UE which causes unnecessary signalling overhead. The S-UE selection principle needs to be considered. On the other hand, for ensuring that the gNB could provide efficient resource scheduling, assistance information needs to be reported from S-UE, and what is the assistance information and when to report the assistance information should be designed as well.

Another issue is: in the case that one group covers multiple cells, duplicate resources may be scheduled for the same M-UE since different gNB may configure different S-UE for this group.

Figure 3:
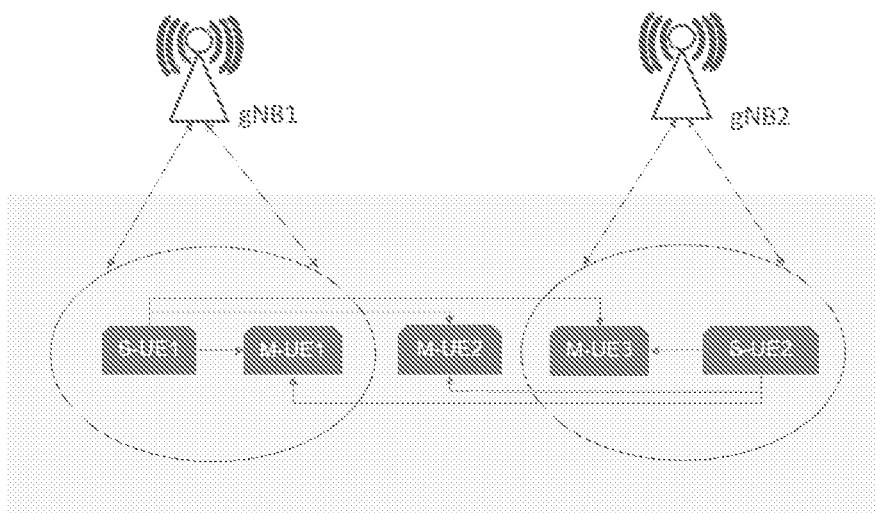
FIG. 3 illustrates a schematic diagram of a wireless communication system in accordance with some embodiments of the present application.

As shown in FIG. 3, when S-UE is configured by gNB, if one group covers multiple cells, then different gNB may configure different S-UE for this group. This may lead to duplicate resource scheduling process for the same M-UE, which cause interference in sidelink transmission. Therefore, some scheduling rules or UE behaviors need to be defined to coordinate the resource scheduled by different gNB in cross-cell scenario.

Another issue is: resource allocation mode determination could be affected by traffic or AS layer conditions, then when and how the group M-UEs perform the mode switch should be defined, which including the case: 1) initialization of mode2d operation for M-UEs; 2) M-UEs switch from mode2d to other sub-modes (ordinary mode1/mode2).

Another issue is: scheduling UE may change frequently between different cells when the group move fast during the trip, which cause low reliability and high power consumption on scanning the scheduling UE for group M-UEs.

Advance service causes a new challenge in terms of adapting changing network conditions. If the platoon run fast on highway, during the trip, it may pass different coverage scenarios, then both the scheduling UE and member UE may change frequently between different cells since gNB configures the S-UE. In this way, the higher reliability may not be guaranteed and the power consumption on scanning the scheduling UE will be higher.

The present application provides solutions to address the issues in mode2d, for example, the above mentioned issues.

According to one aspect of the present application, the present application provides a new resource scheduling procedure. The procedure are explained in details as follows:

In the S-UE configuration step, gNB may configure a common S-UE qualification criterion. Such configuration could be broadcasted by system information (SIB) signaling or transmitted by dedicated RRC signaling. The configuration parameters includes at least one but not limited to the following elements:
 S-UE selection enabling or disabling indication: the indication is configured to indicate the cell support S-UE selection and to inform group member UE in the cell that S-UE needs to be determined for the group;
 Threshold of reachable Member UE number: the threshold is configured to indicate that only the number of reachable member UE beyond the threshold, the M-UE can request to become a S-UE;
 Threshold of specified signal strength (i.e. RSRP): the specified signal strength threshold is configured to indicate that only the measurement results between gNB and one M-UE is beyond the threshold, the M-UE can request to become a S-UE;
 Threshold of specified CBR: the specified CBR threshold is configured to indicate that only the CBR measurement results between gNB and one M-UE is below the threshold, the M-UE can request to become a S-UE.

In some embodiments, M-UEs which satisfy the configured conditions may transmit request to gNB to become a S-UE. Such request could be transmitted by dedicated RRC signaling, which may including but not limited to M-UE ID, cell ID, UE capability, reachable M-UEs information and corresponding coverage information. Then gNB may configure one or more S-UE for the group.

Then, the configured one or more S-UEs may broadcast the scheduling indication to member UEs in group to inform that there have scheduling UE could provide scheduled resources.

In some embodiments, S-UE may report assistance information to gNB for mode2d group wise resources allocation, such assistance information could be transmitted by dedicated RRC signaling, and could be transmitted along with UE assistance information. The reporting may include at least one but not limited to the following parameters:

Group information: including group id, group size;

Traffic information: including traffic characteristic parameters based on the acknowledge information from S-UE itself. That means S-UE can evaluate the traffic information for this group based on some prior information, which is UE implementation and No need for standardization.

Member UE information: including member UE ID, cell ID and corresponding traffic characteristic parameters (e.g. a set of preferred SPS inter interval, timing offset with respect to sub-frame 0 of the SFN 0, PPPP, PPPR, Destination Layer-2 ID, and maximum TB size based on observed traffic pattern) related to SPS configuration.

S-UE can specify partial M-UE to report Member UE information to S-UE, such reporting could be by dedicated RRC signaling, then RRC connection between S-UE and the M-UE is initiated;

And, the trigger conditions for such report may include at least one of following aspects:

When UE is configured or determined to serve as the S-UE for the group;

When S-UE receives schedule request from group M-UEs;

When group size or the number of reachable member UEs or traffic resource size of M-UEs have changed beyond the configured threshold within a specified time period.

When configured S-UE for one group move from one cell to another cell.

In some embodiments, GNB configures group-based resource information to S-UE by RRC dedicated signalling when receive the report; Then S-UE transmits the resource information to M-UE by group cast or broadcast message. M-UE perform sensing and resource selection in the configured resource information.

The resource information could be resource pool or specified resource subset for the group or individual resource/resource pool for each M-UE.

Another aspect of the present application is directed to the multi-cell case.

In some embodiments, how to handle the case that one group covers multiple cells is discussed, the number of cells that one group covers is more than one (i.e. gNB1, gNB2, gNB3 . . . ) in this case. Since different gNB may configure different S-UE for this group, this may lead to duplicate resource for the same M-UE. Therefore, in this embodiment, when one M-UE in this group receive multiple scheduling indication for this group, the M-UE only select one S-UE based on measurement results, such measurements results could be signal strength (i.e. RSRP), then RRC connection is triggered for the M-UE to initiate schedule request to the selected S-UE, such schedule request including UE information and corresponding traffic characteristics. Then the selected S-UE transmits the received schedule request from M-UE to gNB for resources.

In some embodiments, when different S-UEs are configured by different gNB for the same group, gNB may only provide scheduled resource to those M-UEs in its coverage, or out of coverage M-UEs through the configured S-UE based on reported M-UE's cell ID information, i.e. gNB does not provide resource for M-UEs in other cells. For example, as FIG. 3 shown, gNB1 provides scheduled resource to S-UE1 for M-UE1, M-UE2, and gNB2 provides scheduled resource to S-UE2 for M-UE3, M-UE2; in such case, the procedures may comprise the following steps:

a) Configured S-UE transmits scheduling indication to group M-UEs;

b) Group M-UEs report UE information to the configured S-UE, such information including at least but not limited to UE ID, cell ID, traffic characteristics;

c) Configured S-UE in each cell reports the received group M-UE information to gNB;

d) gNB provide scheduled resources to those M-UEs in its coverage, or out of coverage M-UEs through the configured S-UE, based on reported M-UE's cell ID information;

c) Then for out of coverage M-UE, i.e. UE2 in FIG. 3, it will receive scheduled resources from multiple S-UEs configured by different gNB. The M-UE can determine to use scheduled resources from both S-UEs or select scheduled resource from one S-UE.

In some embodiments, different gNB may perform coordination by X2 interface on the S-UE determination to guarantee only one S-UE is configured for one group before resource scheduling, and then determined S-UE receive the configuration command from its gNB.

The coordination performed before the S-UE configuration of each cell, then only the determined S-UE is configured by its serving cell by dedicated RRC signaling.

The determined S-UE only provides scheduled resources for M-UEs in the same cell, or out of coverage UE; and for other M-UEs in this group, the resource (pool) configured or preconfigured by its serving gNB will be used to avoid interference.

In some embodiments, configured S-UE in each cell may report the reachable M-UE information to its gNB by dedicated RRC signaling. The information including at least one but not limited to the following parameters:

UE ID: the UE means reachable member UE from S-UE's perspective.

Measurement results: the measured signal strength (i.e. RSRP) or CBR value between S-UE and M-UE.

Traffic information: the traffic information could be based on the acknowledge information from S-UE itself; or the traffic information report from each M-UE to the S-UE if it is supported.

The traffic information means traffic characteristic parameters (e.g. a set of preferred SPS interval, timing offset with respect to sub-frame 0 of the SFN 0, PPPP, PPPR, Destination Layer-2 ID, and maximum TB size based on observed traffic pattern) related to the SPS configuration.

When each gNB receives its S-UE reporting, coordination between gNB through X2 interface is performed to guarantee each M-UE is scheduled by only one S-UE and then each gNB provides coordination results to its S-UE, the results including at least one but not limited to:

UE ID: including the M-UEs that configured S-UE in this cell should responsible for, or configured S-UE in this cell should provide scheduling resource for these M-UEs;

Resource information: the resource information could be individual resource/resource pool for each M-UE, resource pool or specified resource subset for group M-UEs.

Another aspect of the present application provides a mode switch and mobility scenario, whose details are explained as follows:

Initialization of mode2d operation for group M-UEs may be performed firstly.

For each group M-UE, it may start to perform mode2d operation if one of the following conditions is met:
  When M-UE receive the scheduling indication from S-UE;
  When M-UE receive the scheduled resource pool/resource subset or individual resource from S-UE;
  It is left to UE implementation, UE could determine it based on service requirements.

M-UEs keep using previous resources until the scheduled resources from the S-UE is available.

Then, Mode2d resource scheduling process may be performed, which may be the similar with the relevant procedure described above.

After that, the Group UEs may move from one cell to another cell.

Some embodiments focus on the case that group (e.g. platooning) pass different coverage scenarios during the trip. In some embodiments, to avoid frequent change of group S-UE, when one group moves from one cell (previous cell) to another cell (new cell), previous gNB informs new gNB about the group S-UE information in handover command. The information including at least one but not limited to the following parameters:
  S-UE indication: the indication is used to inform new gNB to reuse the S-UE and no need to configure new S-UE;
  Group information: including group id, group size and internal UE ID in the group;
  Group traffic information: including the reported traffic information from previous S-UE;

In some embodiments, group M-UEs may keep using the S-UE which configured by previous cell. New gNB will provide scheduled resource to the S-UE when receive handover command, and the new schedule resources may override the previous scheduled resources for M-UEs.

In some embodiments, when one group moves form one cell (previous cell) to another cell (new cell), the information that previous gNB informs new gNB which included in the handover command may include at least one but not limited to the following parameters:
  S-UE selection indication: the indication is used to inform new gNB to reselect new S-UE for the group;
  Group information: including group id, group size and internal UE ID in the group;
  Group traffic information: including the reported traffic information from previous S-UE.

In some embodiments, new gNB may perform new S-UE configuration when receive the command, and provide resources to group M-UEs by the new S-UE when it is configured. M-UEs may keep using previous resources until the scheduled resource from new S-UE is available. Alternatively, M-UEs may use the resources in exceptional pool as legacy handover procedure until the scheduled resource from new S-UE is available.

Group M-UEs may stop to perform mode2d operation if one of the following conditions is met:
  When the configured S-UE of the group stops scheduling
    The signal strength (e.g. RSRP) between S-UE and gNB is lower than specified threshold within a timer; or
    The channel statue between S-UE and gNB become worse, i.e. the CBR value is beyond a specified threshold within a timer; or
    When radio link failure declared between S-UE and M-UE;
    The S-UE leave the group, which determined by upper layer.
  When M-UEs leave the group, which determined by upper layer.
  When sidelink between M-UE and S-UE have problems
    When signal strength (e.g. RSRP) between the M-UE and S-UE is lower than specified threshold within a timer;
    When sidelink channel statue become worse, i.e. the CBR value is beyond a specified threshold within a timer;
    When radio link failure declared between S-UE and M-UE;
  If multiple S-UEs are worked for one group, when all S-UE in the group are not availed for the M-UE based on above conditions.

Figure 4:
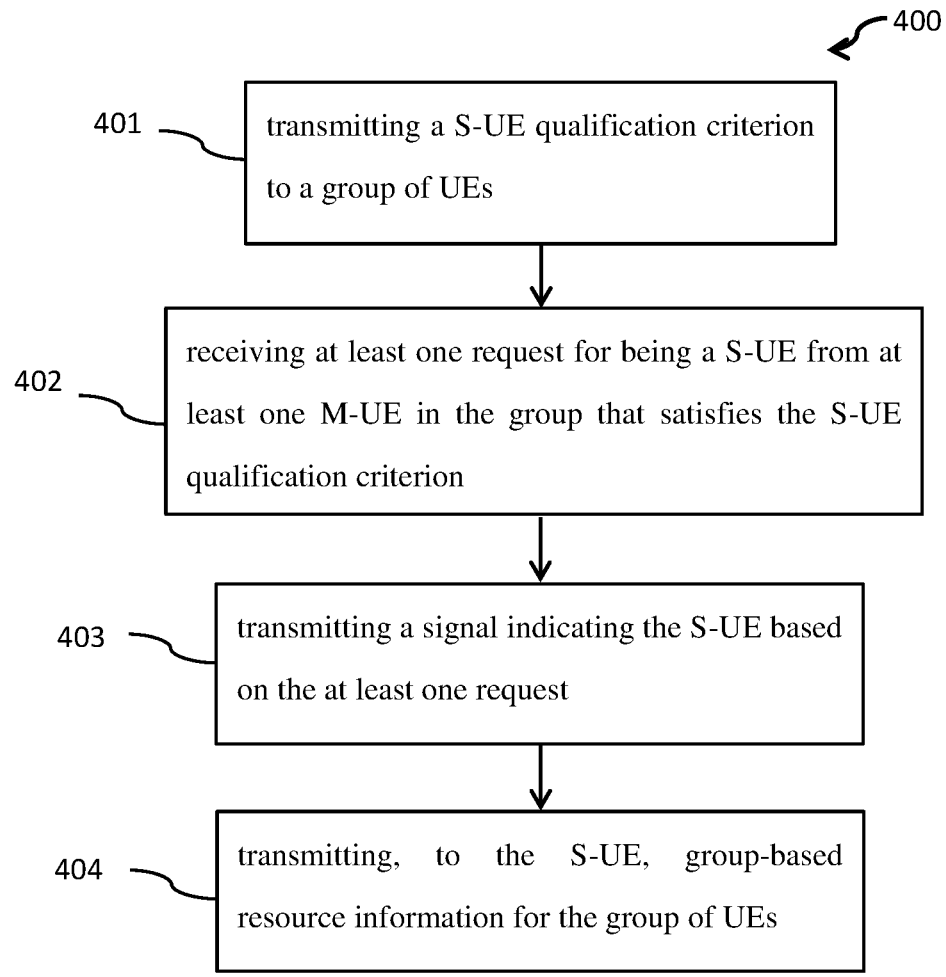
FIG. 4 illustrates a flow chart of a method for wireless communication in accordance with some embodiments of the present application.

Before the new resources is available, M-UEs may:
M-UEs keep using previous scheduled resources until new resources is available; Or
M-UEs keep using previous scheduled resources within a specific time window; Or
M-UEs use the resources in exceptional pool until the new resource is available;
Meanwhile:
  M-UEs perform sensing and resource selection autonomously in pre-configured resource pool; or
  M-UEs trigger RRC connection to gNB and transmits schedule request to gNB directly if the UE is in coverage; or
  M-UEs receive new S-UE indication from the group and triggers schedule request to the new S-UE if detects successfully:

FIG. 4 illustrates a flow chart of a method for wireless communication in accordance with some embodiments of the present application. The exemplary method 400 as illustrated and shown in FIG. 4 is performed by a BS.

In the exemplary method 400, in operation 401, the BS (e.g., BS 102a as illustrated and shown in FIG. 1) transmits a scheduling user equipment (S-UE) qualification criterion to a group of UEs.

In operation 402, the BS receives at least one request for being an S-UE from at least one member UE (M-UE) in the group that satisfies the S-UE qualification criterion.

In operation 403, the BS transmits a signal indicating the S-UE based on the at least one request. In some embodiments, before transmitting the signal indicating the S-UE, the BS performs coordination with one or more BSs, so as to guarantee that only one S-UE is configured for the group.

In operation 404, the BS transmits to the S-UE, group-based resource information for the group of UEs. In some embodiments that more than one S-UEs are configured by more than one S-UEs, the group-based resource information send by a BS is only for one or more M-UEs in the group and in coverage of said BS and one or more M-UEs in the group and not in coverage of any BS. The BS may determine whether an M-UE is in its coverage based on the cell identify (ID) information of the M-UE. In some embodiments that more than one S-UEs are configured by more than one S-UEs, each BS receives the S-UE reporting, coordination between gNB through X2 interface is performed to guarantee each M-UE is scheduled by only one S-UE, then each BS provides coordination results to its S-UE.

Figure 5:
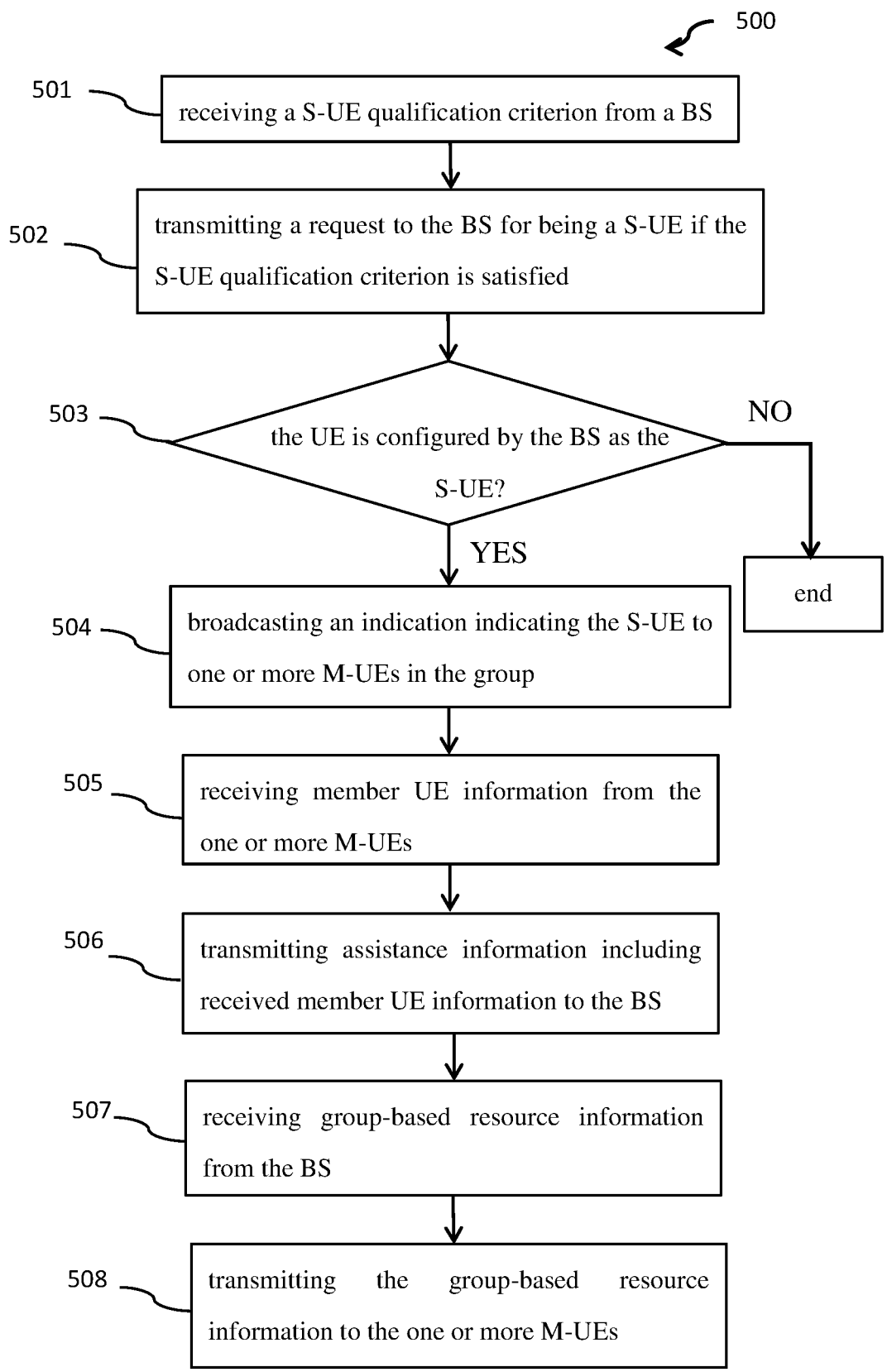
FIG. 5 illustrates another flow chart of a method for wireless communication in accordance with some embodiments of the present application.

FIG. 5 illustrates a flow chart of a method for wireless communication in accordance with some embodiments of the present application. The exemplary method 500 as illustrated and shown in FIG. 5 is performed by a UE.

In the exemplary method 500, in operation 501, the UE (e.g., UE 101a as illustrated and shown in FIG. 1) receives a scheduling user equipment (S-UE) qualification criterion from a BS.

In operation 502, the UE transmits a request to the BS for being a S-UE if the S-UE qualification criterion is satisfied.

In block 503, if the UE is configured by the BS as the S-UE for a group of UEs, the UE broadcasts an indication indicating the S-UE to one or more member UEs (M-UEs) in the group in operation 504, receives member UE information from the one or more M-UEs in operation 505, transmits assistance information to the BS in operation 506, receives group-based resource information from the BS in operation 507, and transmits the group-based resource information to the one or more M-UEs in operation 508. The assistance information comprises at least one of: group information, traffic information and member UE information. In some preferred embodiments, the method further comprises specifying a part of M-UEs in the group, and the assistance information is for only said part of M-UEs in the group. In some other preferred embodiments, the S-UE reports reachable M-UE information to the BS for coordination with a different BS, and receives coordination results from the BS. By doing so, only one S-UE is configured for one M-UE in the group.

Figure 6:
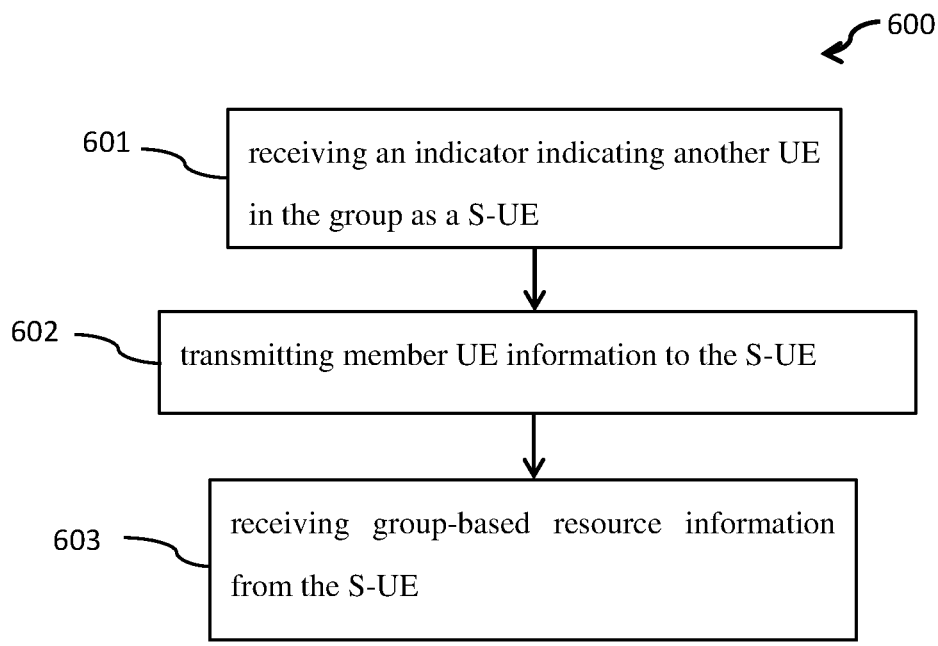
FIG. 6 illustrates a flow chart of a method for wireless communication in accordance with some embodiments of the present application.

FIG. 6 illustrates a flow chart of a method for wireless communication in accordance with some embodiments of the present application. The exemplary method 600 as illustrated and shown in FIG. 6 is performed by a UE.

In the exemplary method 600, in operation 601, the UE (e.g., UE 101a as illustrated and shown in FIG. 1) receives an indicator indicating another UE in the group as a scheduling user equipment (S-UE).

In operation 602, the UE transmits member UE information to the S-UE.

In operation 603, the UE receives group-based resource information from the S-UE.

In some embodiment, if the UE receives another indicator indicating another UE as the S-UE from another BS, e.g., a BS other than BS 102a, the UE may select one S-UE based on their signal strength, and then initiates schedule request to the selected S-UE by PC5 RRC signalling. The schedule request including UE information and corresponding traffic characteristics. Accordingly, if group-based resource information from two S-UEs is received, the UE may use the group-based resource information from the selected S-UE.

Figure 7:
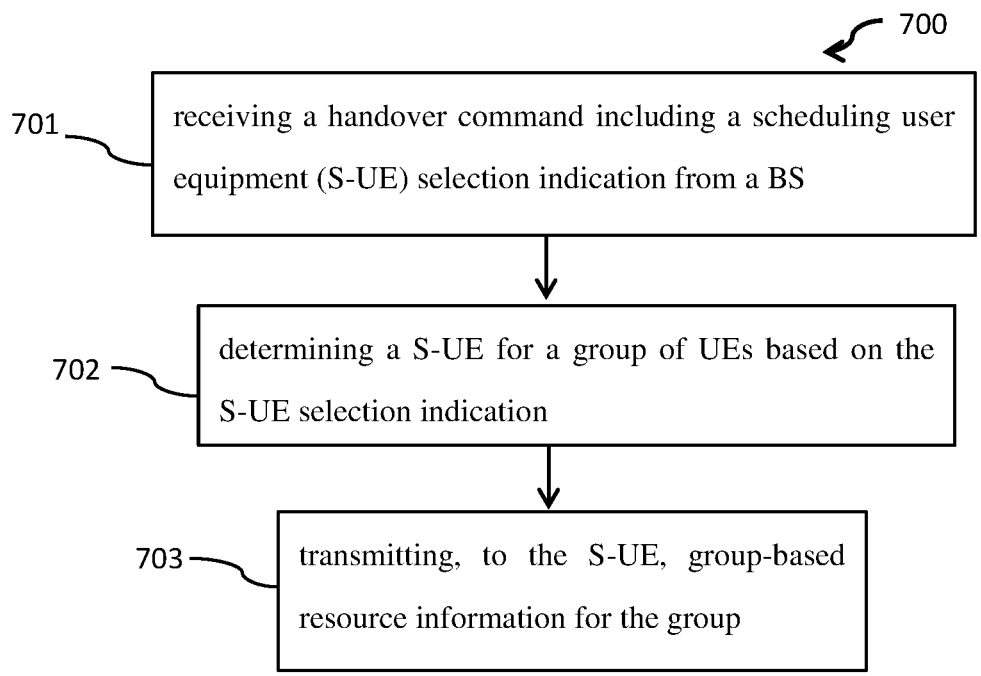
FIG. 7 illustrates a flow chart of a method for wireless communication in accordance with some embodiments of the present application.

FIG. 7 illustrates a flow chart of a method for wireless communication in accordance with some embodiments of the present application. The exemplary method 700 as illustrated and shown in FIG. 7 is performed by a BS.

In the exemplary method 700, in operation 701, the BS (e.g., BS 102a as illustrated and shown in FIG. 1) receives a handover command from another BS, wherein the handover command comprises a scheduling user equipment (S-UE) selection indication and at least one of group information and group traffic information.

In operation 702, the BS determines an S-UE for a group of UEs based on the S-UE selection indication. In some embodiments, the BS may determine the old S-UE configured by the previous BS as the S-UE for the group. Accordingly, the re-connection between the new S-UE and M-UE is not needed. In some embodiments, if the S-UE selection indication indicates to reselect a new S-UE, the BS may transmit a S-UE qualification criterion to the group of UEs; receive at least one request for being the S-UE for the group from at least one M-UE in the group that satisfies the S-UE qualification criterion; and transmit a signal indicating the selected S-UE.

In operation 703, the BS transmits, to the S-UE, group-based resource information for the group.

Figure 8:
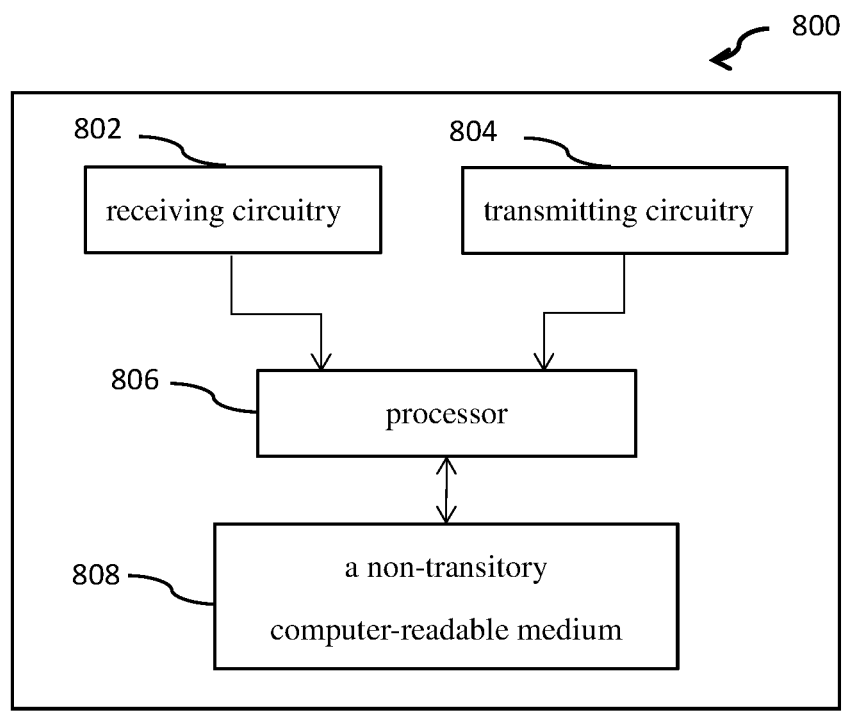
FIG. 8 illustrates a block diagram of an exemplary apparatus in accordance with some embodiments of the present application.

FIG. 8 illustrates a block diagram of an exemplary apparatus in accordance with some embodiments of the present application. Referring to FIG. 8, the apparatus 800 includes a receiving circuitry 802, a transmitting circuitry 804, a processor 806, and a non-transitory computer-readable medium 808. The processor 806 is coupled to the non-transitory computer-readable medium 808, the receiving circuitry 802, and the transmitting circuitry 804.

It is contemplated that some components are omitted in FIG. 8 for simplicity. In some embodiments, the receiving circuitry 802 and the transmitting circuitry 804 may be integrated into a single component (e.g., a transceiver).

In some embodiments, the non-transitory computer-readable medium 808 may have stored thereon computer-executable instructions to cause a processor to implement the operations with respect to UE(s) and BS(s) as described above.

The method of the present application can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which there resides a finite state machine capable of implementing the flowcharts shown in the figures may be used to implement the processor functions of the present application.

Those having ordinary skills in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed is:

1. A base station for wireless communication, comprising:
at least one memory; and
at least one processor coupled with the at least one memory and operable to cause the base station to:
transmit a scheduling user equipment (S-UE) qualification criterion to a group of UEs, wherein the S-UE qualification criterion comprises at least a threshold number of reachable member UEs (M-UEs);
receive at least one request for being a first S-UE from at least one M-UE in the group that satisfies the S-UE qualification criterion, wherein the request comprises at least a cell identity (ID) associated with the first S-UE;
transmit a signal indicating the first S-UE based on the at least one request; and
transmit, to the first S-UE, group-based resource information for the group of UEs.

2. The base station of claim 1, wherein the at least one processor is further operable to cause the base station to receive assistance information from the first S-UE.

3. The base station of claim 2, wherein the assistance information comprises at least one of: group information, traffic information, or member UE information.

4. The base station of claim 1, wherein the request further comprises at least one of: an M-UE identity (ID), a UE capability, reachable M-UE information, or corresponding coverage information.

5. The base station of claim 1, wherein to transmit the S-UE qualification criterion, the at least one processor is further operable to cause the base station to perform one or more of to broadcast the S-UE qualification criterion by system information block (SIB) signaling, or to transmit the S-UE qualification criterion by dedicated radio resource control (RRC) signaling.

6. The base station of claim 1, wherein the S-UE qualification criterion further comprises at least one of following parameters:
S-UE selection enable or disable indication;
a threshold specified signal strength; or
a threshold specified channel busy ratio (CBR).

7. The base station of claim 1, the first S-UE is configured as a single S-UE for the group of UEs.

8. A user equipment (UE) for wireless communication, comprising:
at least one memory; and
at least one processor coupled with the at least one memory and operable to cause the UE to:
receive a scheduling UE (S-UE) qualification criterion from a base station (BS), wherein the S-UE qualification criterion comprises at least a threshold number of reachable member UEs (M-UEs);
transmit a request to the BS to be an S-UE in response to the S-UE qualification criterion being satisfied, wherein the request comprises at least a cell identity (ID) associated with the S-UE; and
in response to being configured by the BS as the S-UE for a group of UEs:
broadcast an indication indicating the S-UE to one or more M-UEs in the group;
receive member UE information from the one or more M-UEs;
transmit assistance information including the member UE information to the BS;
receive group-based resource information from the BS; and
transmit the group-based resource information to the one or more M-UEs.

9. The UE of claim 8, wherein to transmit the request, the at least one processor is further operable to cause the UE to transmit the request using dedicated radio resource control (RRC) signaling.

10. The UE of claim 8, wherein the request comprises at least one of: an M-UE identity (ID), a UE capability, reachable M-UE information, or corresponding coverage information.

11. The UE of claim 8, wherein the assistance information comprises at least one of: group information or traffic information.

12. The UE of claim 8, wherein the at least one processor is further operable to cause the UE to specify to which M-UEs to report the member UE information.

13. The UE of claim 8, wherein a trigger to transmit the assistance information comprises one or more of:
if the UE is configured as the S-UE for the group;
if the S-UE receives a scheduling request from an M-UE;
if a size of the group goes beyond a first threshold;
if a number of reachable M-UEs goes beyond a second threshold;
if a traffic resource size of M-UEs goes beyond a third threshold; or
if the S-UE moves from one cell to another cell.

14. The UE of claim 8, wherein the at least one processor is further operable to cause the UE to:
report reachable M-UE information to the BS for coordination with a different BS such that the UE is configured as a single S-UE for the group; and
receive a coordination result from the BS.

15. The UE of claim 14, wherein the at least one processor is further operable to cause the UE to report the reachable M-UE information using dedicated radio resource control (RRC) signaling.

16. A first user equipment (UE) for wireless communication, comprising:
at least one memory; and
at least one processor coupled with the at least one memory and operable to cause the first UE to:
receive a first indicator indicating that a second UE in a group of UEs is a scheduling user equipment (S-UE), wherein the S-UE is one of at least a threshold number of reachable member UEs (M-UEs);
transmit member UE information to the S-UE, wherein the member UE information comprises at least a cell identity (ID) associated with the S-UE; and
receive group-based resource information from the S-UE.

17. The first UE of claim 16, wherein to transmit the member UE information, the at least one processor is further operable to cause the first UE to:
report member UE information using dedicated radio resource control (RRC) signaling; and
initiate RRC connection with the S-UE after reporting the member UE information.

18. The first UE of claim 16, wherein the at least one processor is further operable to cause the first UE to:

receive a second indicator indicating a third UE as an S-UE; and select one of the second UE or the third UE as an S-UE.

19. The first UE of claim 18, wherein the at least one processor is further operable to cause the first UE to select one of the second UE or the third UE as an S-UE based at least in part on a signal strength of the second UE and the third UE.

20. A method performed by a base station, the method comprising:

transmitting a scheduling user equipment (S-UE) qualification criterion to a group of UEs, wherein the S-UE qualification criterion comprises at least a threshold number of reachable member UEs (M-UEs);

receiving at least one request for being a first S-UE from at least one M-UE in the group that satisfies the S-UE qualification criterion, wherein the request comprises at least a cell identity (ID) associated with the first S-UE;

transmitting a signal indicating the first S-UE based on the at least one request; and transmitting, to the first S-UE, group-based resource information for the group of UEs.

* * * * *